(12) United States Patent
Ayrton (10) Patent No.: US 6,918,327 B2
(45) Date of Patent: Jul. 19, 2005

(54) ACTUATOR FOR WORKPIECE HOLDING DEVICE

(75) Inventor: Glenn Donald Ayrton, Sowerby Bridge (GB)

(73) Assignee: Pratt Burned International Limited, West Yorkshire (GB)

( * ) Notice: Subject to any disclaimer, the term of this patent is extended or adjusted under 35 U.S.C. 154(b) by 0 days.

(21) Appl. No.: 10/432,747

(22) PCT Filed: Nov. 27, 2001

(86) PCT No.: PCT/GB01/05216
§ 371 (c)(1), (2), (4) Date: Oct. 6, 2003

(87) PCT Pub. No.: WO02/43906
PCT Pub. Date: Jun. 6, 2002

(65) Prior Publication Data
US 2004/0051256 A1 Mar. 18, 2004

(30) Foreign Application Priority Data
Nov. 28, 2000 (GB) .............................. 0028931

(51) Int. Cl.$^7$ .............................................. B23B 25/00
(52) U.S. Cl. ......................................... 82/165; 82/142
(58) Field of Search ................... 82/142, 143, 147, 82/165, 167; 279/134, 135, 110

(56) References Cited

U.S. PATENT DOCUMENTS

| 3,499,657 | A | | 3/1970 | Giraud et al. | |
|---|---|---|---|---|---|
| 4,199,286 | A | | 4/1980 | Kirkham | |
| 4,386,544 | A | | 6/1983 | Fuminier | |
| 4,677,719 | A | * | 7/1987 | Link | ............................. 29/40 |
| 4,852,434 | A | | 8/1989 | Bald | |
| 6,302,006 | B1 | * | 10/2001 | Schroder | ..................... 82/147 |

FOREIGN PATENT DOCUMENTS

| CH | 269248 A1 | 10/1950 |
|---|---|---|
| DE | 3709246 A1 | 10/1988 |

\* cited by examiner

Primary Examiner—Willmon Fridie, Jr.
(74) Attorney, Agent, or Firm—Jennifer L. Skord; Moore & Van Allen PLLC (57) ABSTRACT

A power chucking system 10 comprises a chuck mounted on a headstock, the chuck with its jaws being caused to rotate by rotation or the machine spindle 6. The spindle 6 may be engaged with the pulley 1 in order to rotate a work piece retained within the chuck jaws. A clutch 2 may be used to disengage the spindle 6 from the pulley 1 and to lock the spindle 6 to the head stock. In this configuration, rotation of the pulley 1 will cause an actuator jack 7 to screw or unscrew, into or out of spindle 6, in order to open or close the chuck jaws to grip release the workpiece.

3 Claims, 14 Drawing Sheets

ACTUATOR FOR WORKPIECE HOLDING DEVICE

FIELD OF THE INVENTION

The present invention relates to chucking systems, particularly although not exclusively to the type of system having a chuck with jaws for holding the workpiece which is caused to rotate by applying the machine drive via a spindle drive pulley, to a spindle which passes through the headstock of the machine. Such chucking systems may be, for example, an international wedge chuck or a scroll chuck, and the invention relates in particular (but not exclusively) to either or both of these two types of chuck.

BACKGROUND OF THE INVENTION

In order to open and close the chuck jaws of a powered chuck, a rotating cylinder is mounted to the spindle drive pulley, and this cylinder rotates with the spindle. In a conventional power chucking system hydraulic power is supplied to drive the cylinder axially, and this axial movement of the cylinder is transmitted to the chuck by means of a rod or tube called a "drawbar" or "drawtube". Thus, the grip of the jaws on the workpiece is determined by the hydraulic pressure applied to the cylinder.

This conventional power chucking system suffers from a number of disadvantages, including those arising from the fact that a separate power source is required to drive the rotating cylinder (chuck actuator), namely increased numbers of parts and expense, and increased power consumption due mainly to shearing of oil as the cylinder rotates. Also, the pressure of the rotating cylinder is manually adjusted and can be adjusted to pressures well in excess of the chuck capabilities, which can result in mechanical failure. Other disadvantages include grip hysteresis resulting from stopping a chuck rotating at speed and then starting it again, which can lead to an increase in grip and hence distortion of the workpiece, the safety requirement for additional sensors to detect when the cylinder is near the end of the stroke, and possible loss of grip in the event of loss by pressure to the cylinder.

It is an aim of the present invention to overcome at least one problem associated with the prior art whether referred to herein or otherwise.

SUMMARY OF THE INVENTION

According to a first aspect of the present invention there is provided a chucking system, comprising a chuck with jaws for holding a workpiece, the chuck being mounted on a spindle for rotation therewith by means of the machine drive, chuck actuator means for moving the jaws to grip or release the workpiece, transmission means whereby the machine drive is normally coupled to the spindle to cause rotation thereof, and means for selectively uncoupling said transmission means from the spindle such that rotation of the uncoupled transmission means relative to the spindle drives the chuck actuator means.

Thus, by using the transmission means, directly driven from the machine (spindle) drive, to drive the chuck actuator, the need for a separate rotating cylinder to drive the chuck actuator is eliminated.

Conveniently, this is achieved by means of a coupling, for example a face-tooth (or spline) coupling, which is normally biased, for example by spring means, into engagement with the transmission means whereby the machine drive is transmitted, through the coupling, to the spindle.

The coupling may be disposed for movement between a first position in which the coupling engages the headstock, thereby unlocking the transmission means from the spindle whilst at the same time locking the transmission means to the headstock, and a second position in which the coupling engages the spindle, thereby locking the transmission means to the spindle whilst at the same time unlocking the transmission means from the headstock.

Preferably, the coupling is disposed for lateral movement between the first position and the second position.

Preferably, the system comprises a coupling which is normally biased into engagement with the transmission means whereby the machine drive is transmitted, through the coupling, to the spindle.

The coupling may comprise a spline member.

Alternatively, the coupling may include a clutch and may include a dog clutch or similar arrangement. In such an arrangement, a clutch is disposed for lateral movement (which may be effected for example by an electromagnetic actuator) between a first position in which a first surface of the clutch engages with a surface or plate fixed to the headstock, thereby unlocking the transmission means (e.g. drive pulley) from the spindle whilst at the s same time locking it to the headstock, and a second position in which a second surface of the clutch engages with a surface or an attachment fixed to the spindle, thereby locking the transmission means to the spindle whilst at the same time unlocking it from the headstock.

The first surface of the clutch may comprise an outer surface of the clutch. The second surface of the clutch may comprise an inner surface of the clutch.

The lateral movement of the clutch or coupling may be effected by electric means and preferably by an electromagnetic actuator.

The transmission means may comprise a drive pulley.

Preferably, the uncoupling of the transmission means from the spindle is achieved by lateral movement of the coupling away from the transmission means, and in the preferred embodiment this is effected magnetically, using a solenoid. Alternatively, the coupling may be moved by pneumatic or hydraulic means.

The transmission means may comprise a drive pulley which, when uncoupled from the spindle in accordance with the present invention, drives a screw-type actuator, such as a screw jack, to actuate the chuck. Alternatively, the uncoupled drive pulley may drive a scroll chuck directly, using a torque tube or, if a larger torque is required to drive a more powerful scroll chuck, the pulley may drive a gear within a gearbox and may drive a planetary gear drive, or any other gearbox arrangement. With regard to the use of a gearbox, the output of the gearbox may be used to drive a jackscrew.

Thus, in the present invention the grip of the jaws on the work piece is controlled by position or by force, or by a combination of both position and force. Position is determined from the angular displacement of the pulley relative to the spindle, and force is determined from the applied torque or alternatively strain measurement as described hereinafter. This removes the possibility of workpiece distortion which is a common problem with conventional, hydraulically operated power chucks, hence saving cycle time because the jaws are moved only to the extent required.

The jackscrew may comprise a single, threaded cylinder, or alternatively may comprise a number (typically 3) of individual screws arranged around and equally spaced on a pitch circle, the latter being more efficient. A third option is to have two concentric screws (differential screws) of slightly different pitch, to provide a large mechanical advantage.

The jackscrew may comprise two concentric screws (differential screws) at slightly different pitch, which may provide a large mechanical advantage.

The jackscrew may comprise a single threaded cylinder with at least three or more planetary threaded rollers arranged around and equally spaced on a pitch circle, the threaded rollers roll (rather than slide). Such an arrangement offers considerably less resistance making the jackscrew more efficient.

According to a second aspect of the present invention there is provided a method of operating a lathe incorporating a chucking system of the type comprising a chuck with jaws for holding a workpiece, the chuck being mounted on a spindle for rotation therewith by means of the machine drive, chuck actuator means for moving the jaws to grip or release the workpiece, and transmission means whereby the machine drive is normally coupled to the spindle, the method including the step of selectively uncoupling the transmission means from the spindle such that rotation of the transmission means relative to the spindle drives the chuck actuator means.

According to a third aspect of the present invention there is provided a method of actuating the jaws of a chucking system incorporating a spindle rotatably driven by a spindle drive means comprising utilising at least the spindle drive means to actuate the jaws.

According to a fourth aspect of the present invention there is provided a method of actuating the jaws of a chucking system in a lathe having a spindle and spindle prime mover with associated positional and torque control means wherein the jaws are actuated by changing the axial position of the jaw actuation means using either one or both of said positional or torque control means.

BRIEF DESCRIPTION OF THE DRAWINGS

An embodiment of the present invention will now be described, by way of example only, with reference to the accompanying drawings, in which.

DESCRIPTION OF THE PREFERRED EMBODIMENT

Figure 1:
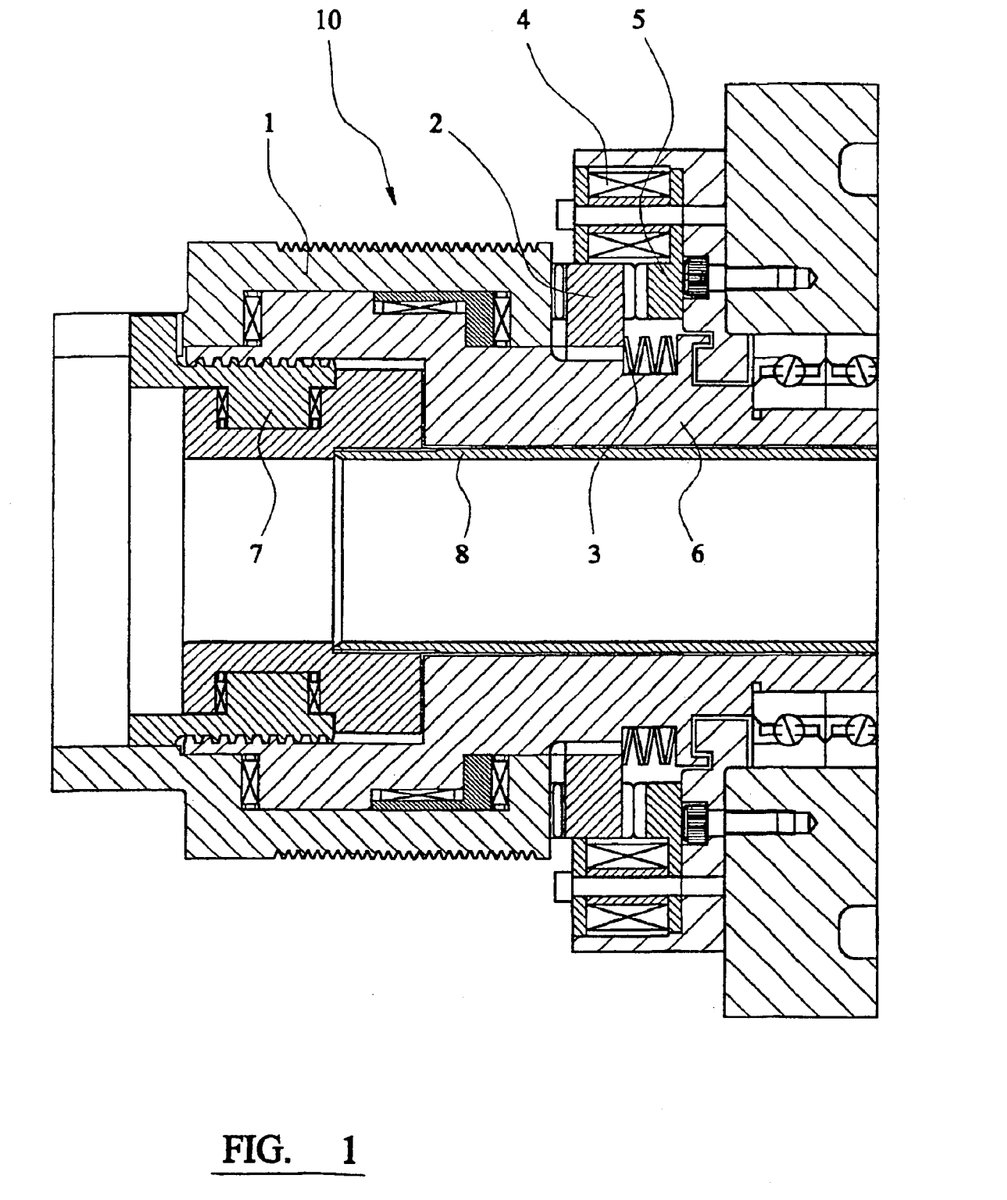
FIG. 1 illustrates the normal operation of the system, with the drive pulley locked on to the spindle.

Referring to the drawings, in FIG. 1 a power chucking system 10 according to the present invention comprises a chuck mounted on a headstock, the chuck with its jaws (not shown) being caused to rotate by rotation of machine spindle 6. In normal operation, the drive pulley 1 by means of which the machine drive is transmitted to the spindle 6, is locked to the spindle by means of a face tooth coupling (clutch) 2 which is pushed by spring 3 into engagement with pulley 1.

Actuation of the jaws of the chuck is effected by rotation of actuator jack 7 which is connected to the chuck via drawtube 8.

Figure 2:
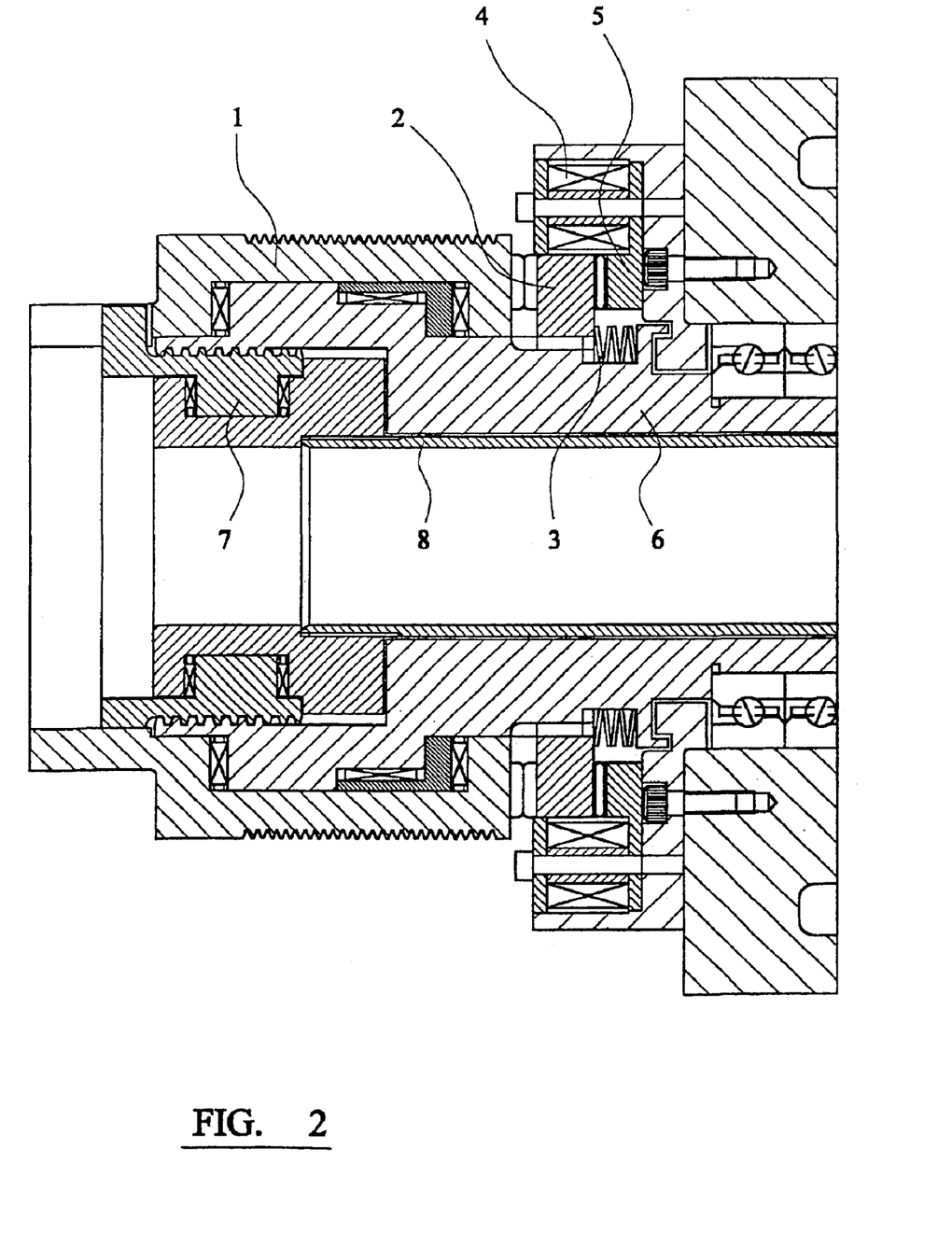
FIG. 2 illustrates the system of FIG. 1 but with the drive pulley unlocked from the spindle.
Figure 3:
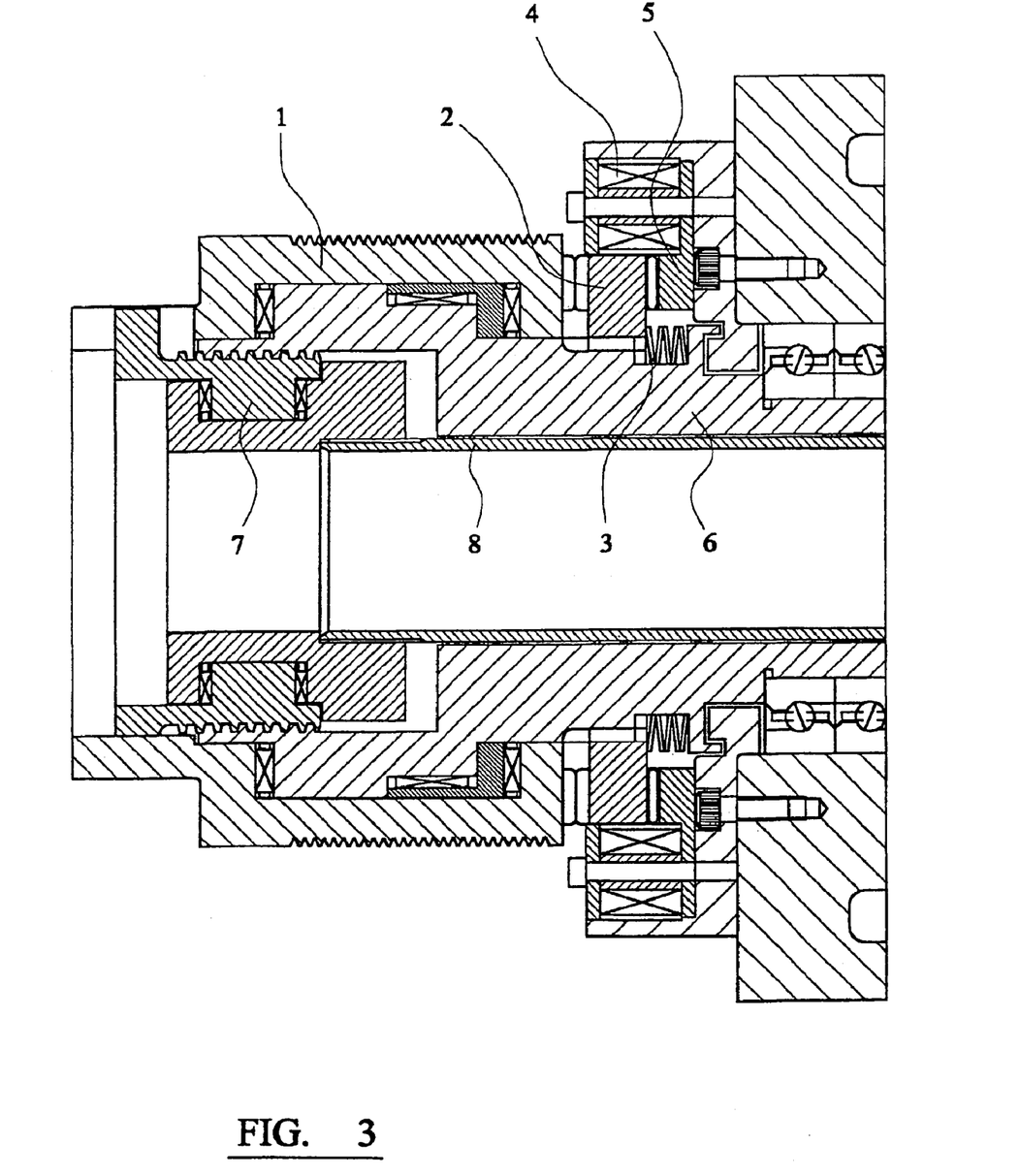
FIG. 3 illustrates the actuation of the chuck.

Whereas in conventional power chucking systems a separately powered (pneumatic or hydraulic) rotating cylinder is mounted on the drive pulley 1 in order to actuate the chuck jaws, in the present invention the chuck s is actuated using the same machine drive as rotates the spindle, i.e. the lathe spindle prime mover drive. This is achieved by a solenoid 4 (or hydraulic means, for example one or more hydraulic cylinders not shown), energisation of which causes face tooth coupling 2 to be attracted magnetically to and engaged with a mating coupling 5 mounted on the headstock. The use of hydraulic means provides a considerable cost saving relative to the use of electric means. Whilst in FIG. 1 the drive pulley 1 is locked to spindle 6 by coupling 2, and hence rotates therewith, in FIG. 2 the coupling 2 is moved away from drive pulley 1 towards the headstock. In FIG. 3, the drive pulley 1 is no longer locked to spindle 6 and is therefore free to rotate about spindle 6.

In this position, when the machine drive is engaged, rotation of the drive pulley 1 about spindle 6 either screws or unscrews actuator jack 7, so that it moves into or out of spindle 6, depending upon its direction of rotation, to open or close the chuck jaws. A strain gauge (not shown) may be provided on the draw tube 8 so that the load can be measured directly. The jackscrew 7 has built in backlash of greater than the index angle, thus ensuring that the drive can reverse to the next full tooth without unwinding the screw.

When the workpiece has been adequately clamped in the jaws, the solenoid 4 is switched off, spring 3 urges face tooth coupling 2 back into engagement with spindle 6 and drive pulley 1 and rotation of the spindle 6 is resumed.

By utilising the main spindle drive to actuate the chuck, all the positional and drive controls are made available to provide all the necessary force and positional limits which would otherwise require separate control devices. The apparatus of the present invention thus represents a compact system with fewer components which is fully integrated into the machine controls to give better positional and force control, has much lower overall power consumption, no grip hysteresis and no risk of loss of grip in the event of a power failure.

The spindle encoder drive is taken from the drive pulley 1, which means that it can be used to control the spindle to stop at an index position (of which there may be several, for example, twelve), ensuring that the face tooth coupling 2 will disengage the pulley and engage with the mating coupling 5 on the headstock. Also, when the pulley rotates about the spindle, since the encoder is driven from the pulley, it is possible to ensure that the pulley reverses back to the next index point to facilitate re-engaging the face tooth coupling 2.

Figure 4:
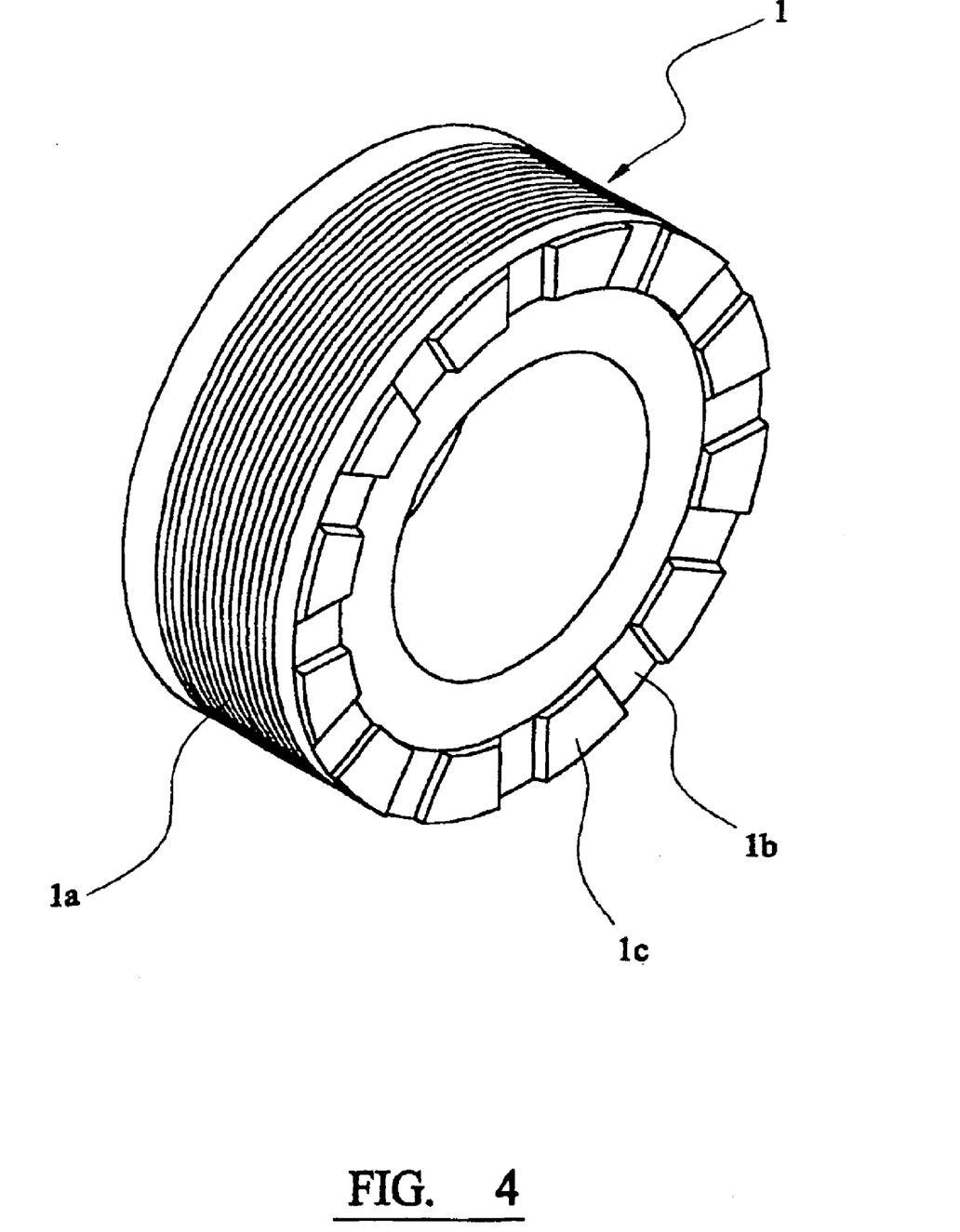
FIG. 4 is a perspective view of the drive pulley.
Figure 5:
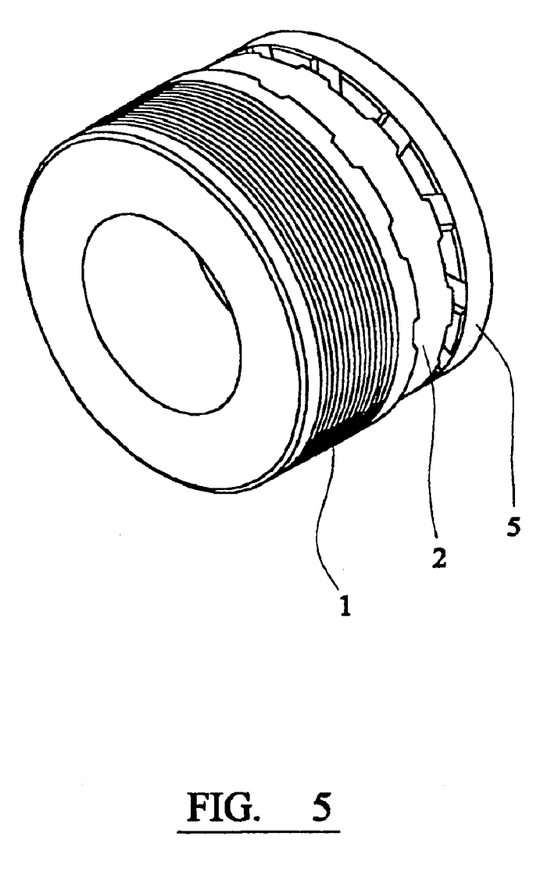
FIG. 5 is a perspective view of the drive pulley, face tooth coupling and head stock mounted coupling, shown with the clearance gap exaggerated.
Figure 6:
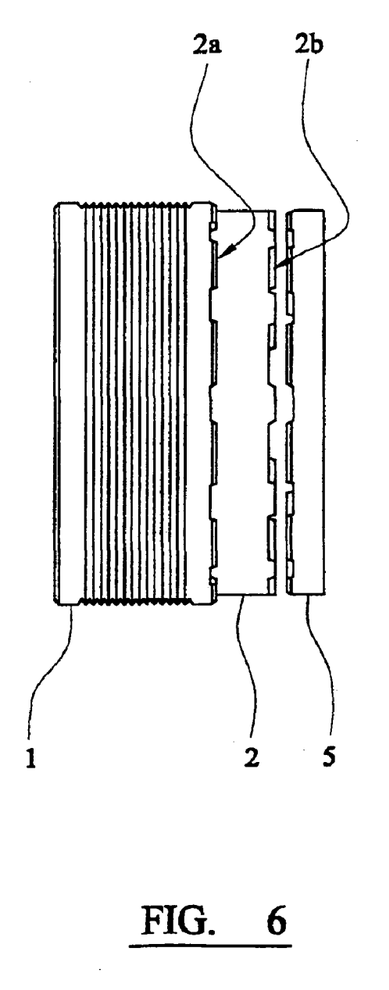
FIG. 6 is a side view of the assembly of FIG. 5, shown with the clearance gap exaggerated.
Figure 7:
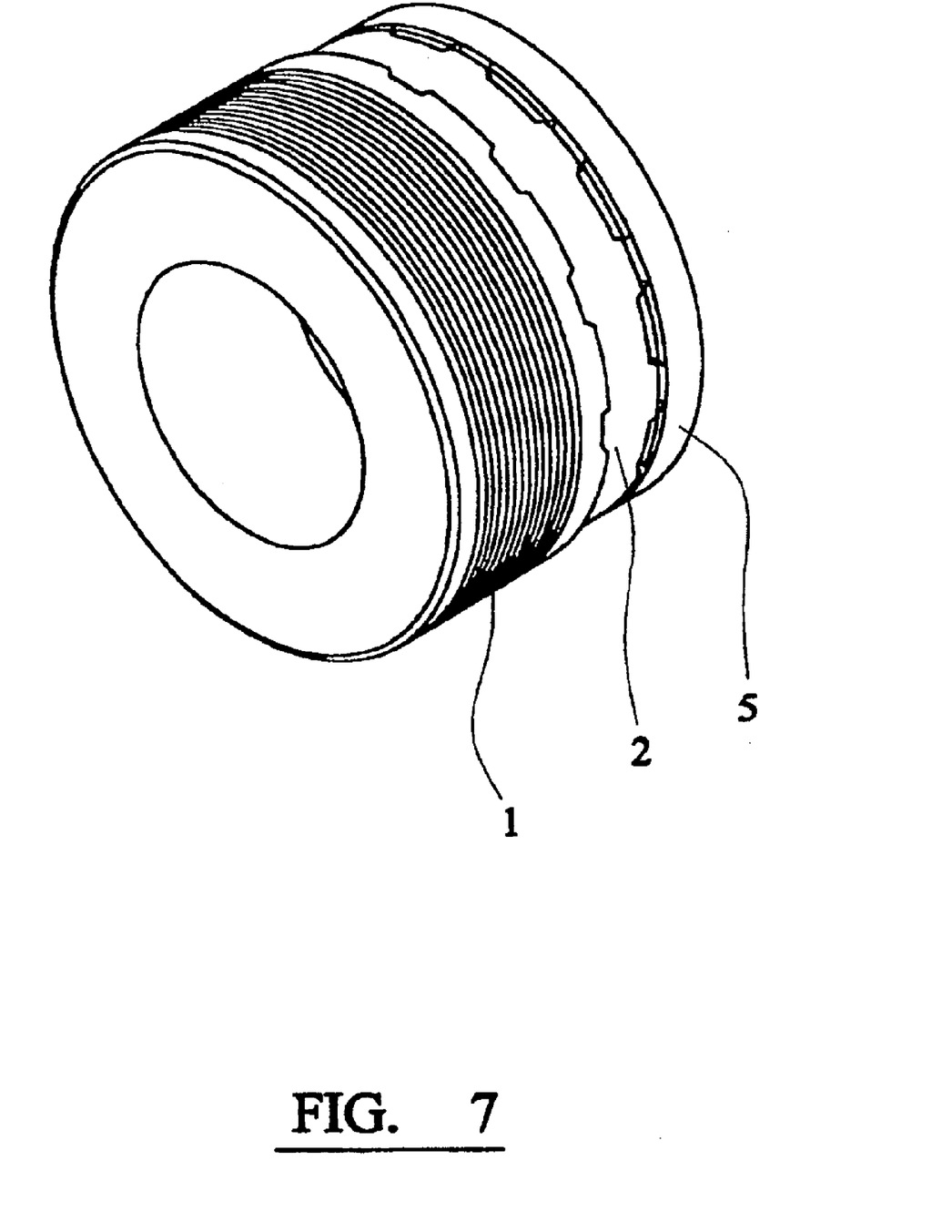
FIG. 7 is a perspective view of the assembly of FIG. 5, but shown with the clearance gap reduced to a typical installation size.
Figure 8:
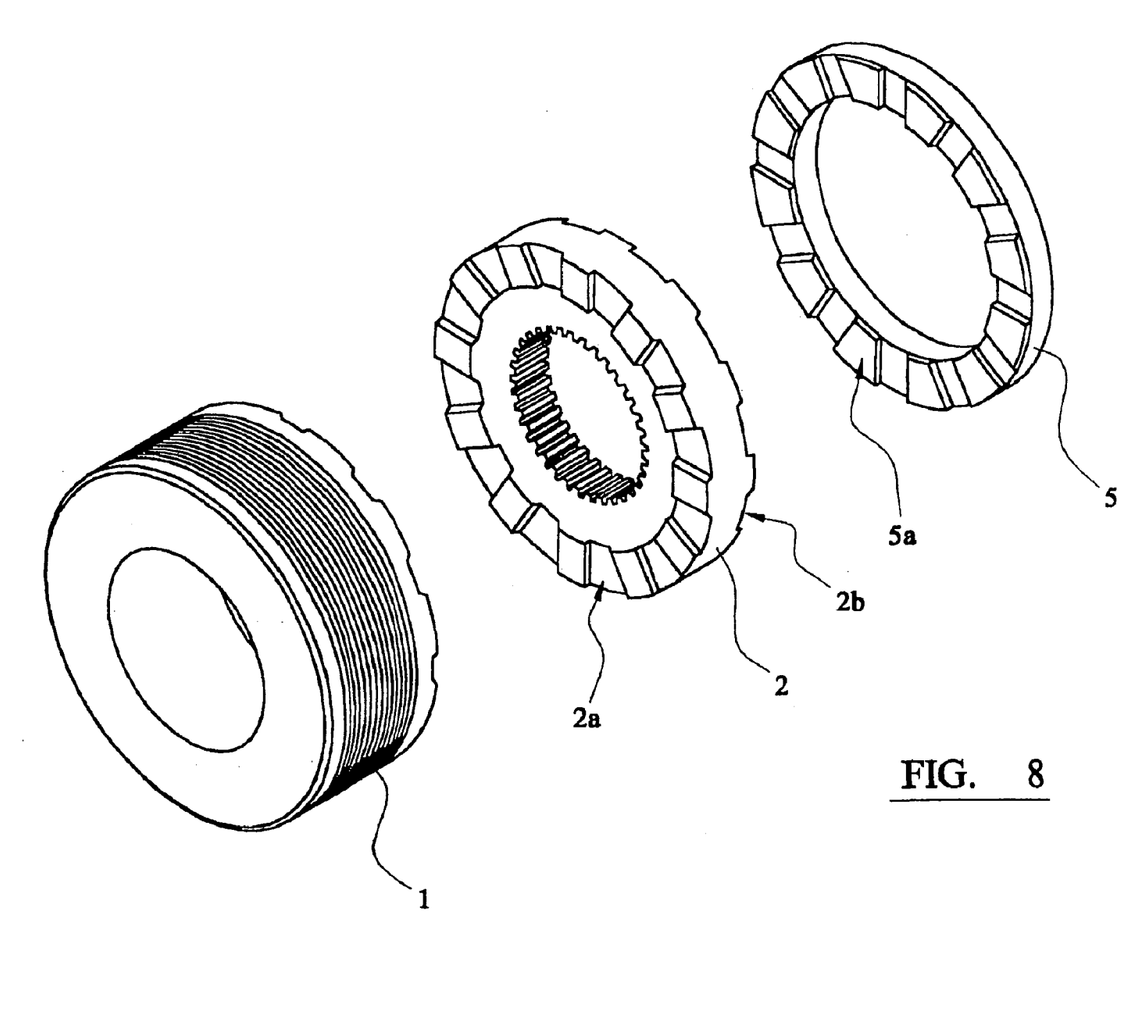
FIG. 8 is an exploded view of a. drive pulley, face tooth coupling (male) and head mounted face tooth coupling (female)

The drive pulley 1 is shown in more detail in FIG. 4, and comprises a threaded outer surface 1*a* and at the end face a series of recesses 1*b* interposed between a series of protrusions 1*c* around the pulley circumference.

In FIGS. 5 through 8 it is illustrated in detail how the drive pulley 1 engages with the face tooth coupling 2 and the mating coupling 5 mounted on the headstock. The face tooth coupling 2 has recesses and protrusions on its two surfaces 2*a* and 2*b*, and mating coupling 5 has recesses and protrusions on its end face 5*a*. Thus, the face tooth coupling 2 can be caused to engage, with respective recesses and protrusions locking together, with either the drive pulley 1 or the mating coupling 5, thereby unlocking the drive pulley 1 from the headstock and locking it to the spindle 6, or locking the drive pulley 1 to the headstock and unlocking it from the spindle 6, respectively.

Figure 9:
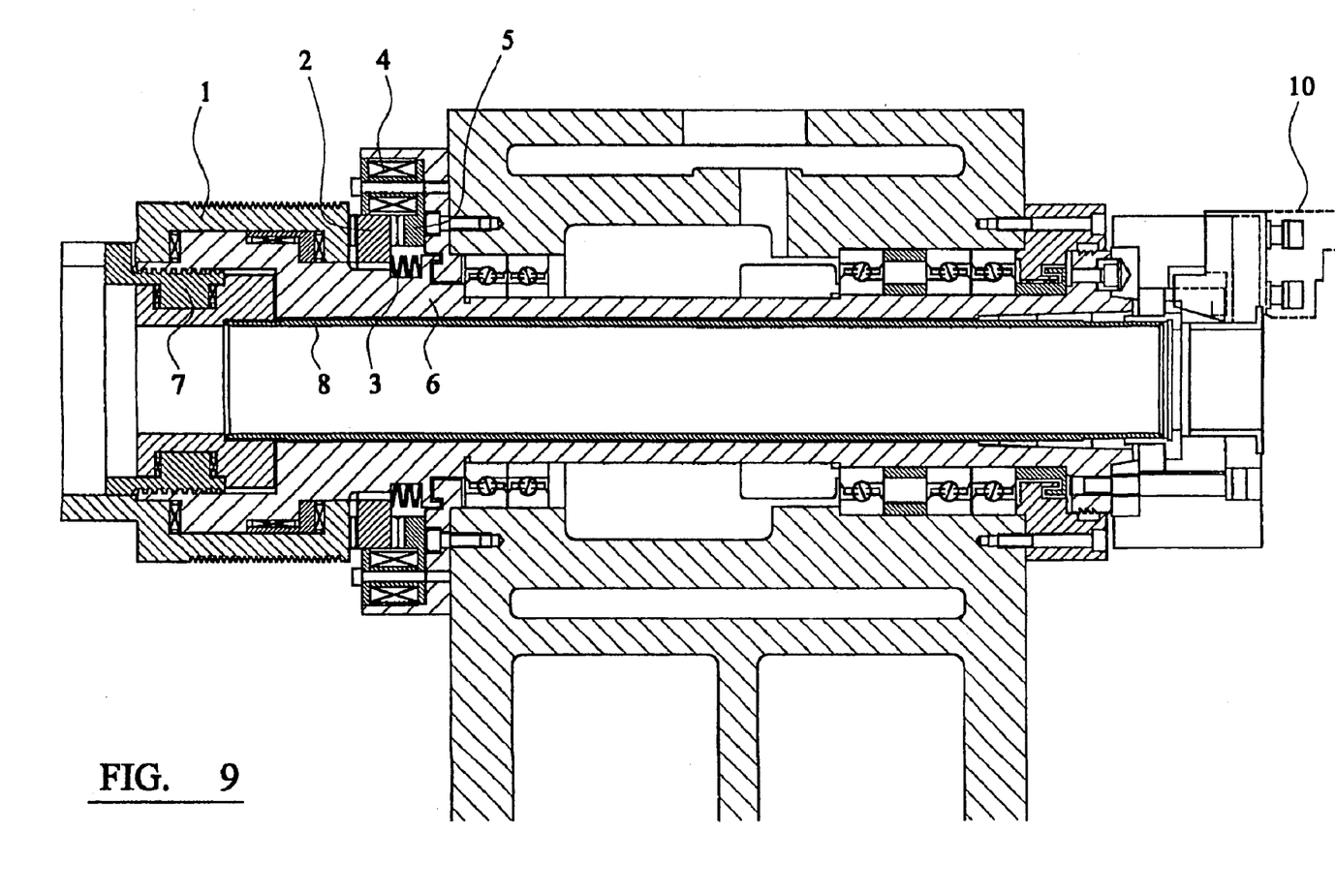
FIG. 9 is a sectional view through an international power chuck assembly incorporating the actuator of the present invention.

FIG. 9 illustrates the entire actuator, drawtube and headstock assembly in which the jaw 10 is shown in dotted lines. From this drawing it can be seen that moving the face tooth coupling 2 axially against the action of spring 3, as described previously or by other means, the drive pulley can be freed from the spindle and its rotation utilised to cause actuation of the jaws via the screwjack 7 and drawtube 8. Although a face tooth coupling is the preferred device, a friction clutch could be used instead.

Although the above description relates to a power chucking system such as an international wedge chuck (for example), the invention may also be applied to a manually operated scroll chuck, thereby effectively transforming it into a powered chuck. This alternative embodiment will now be described with reference to FIGS. 10 through 14.

Figure 10:
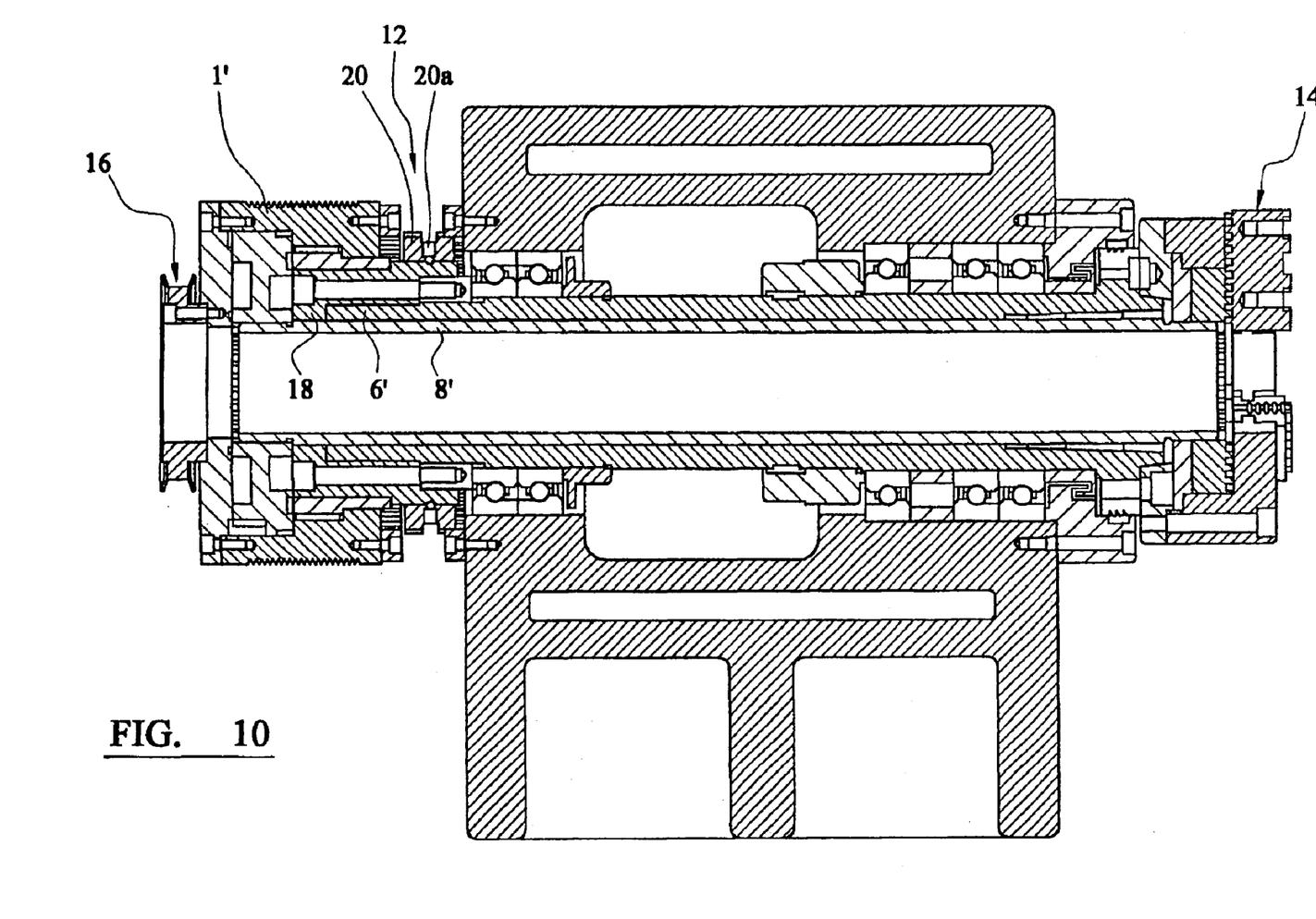
FIG. 10 is a sectional view of an alternative embodiment of the invention, for operation with a scroll chuck.
Figure 11:
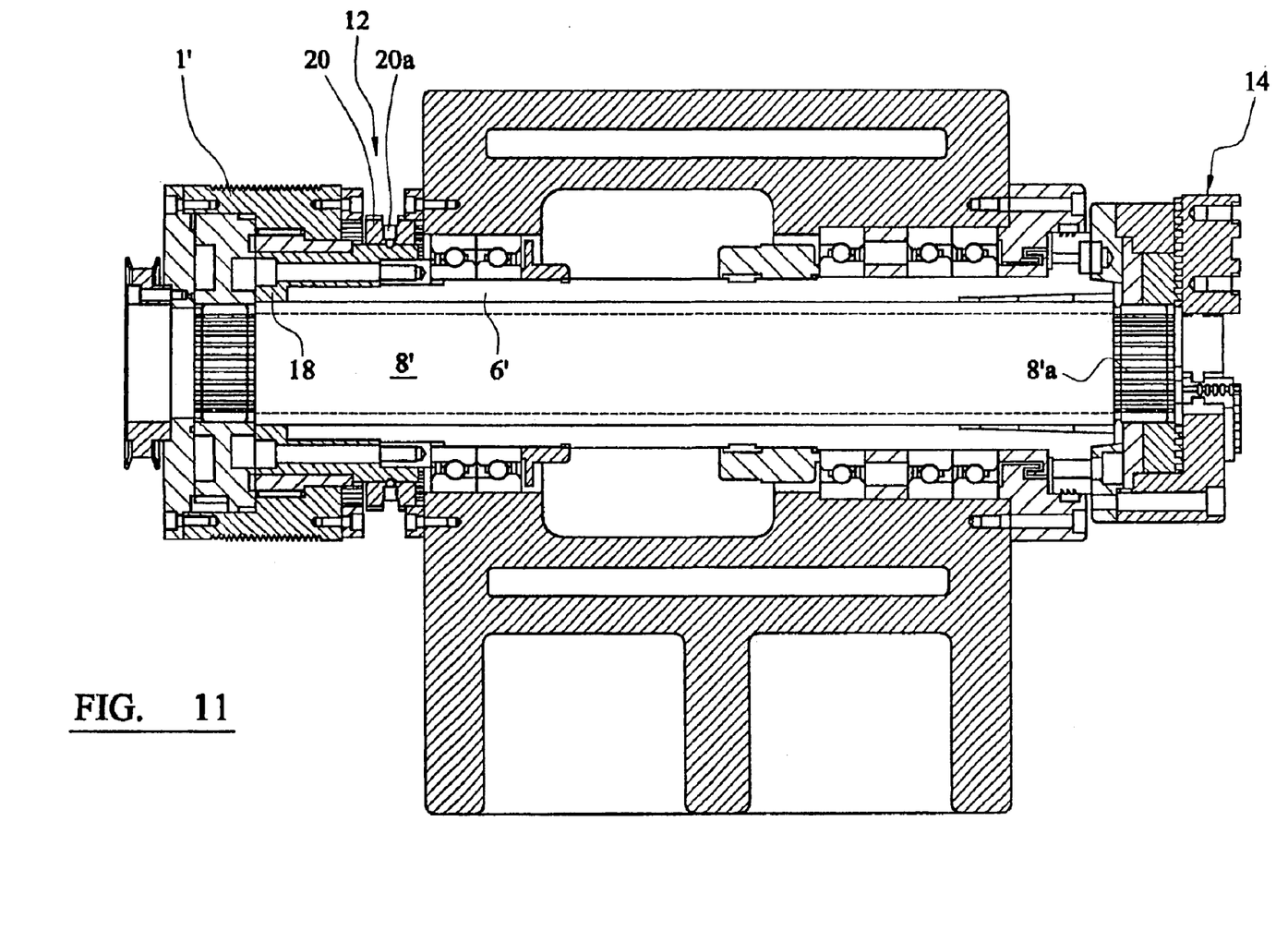
FIG. 11 is a similar view to FIG. 10 but with the torque tube shown unsectioned.
Figure 11A:
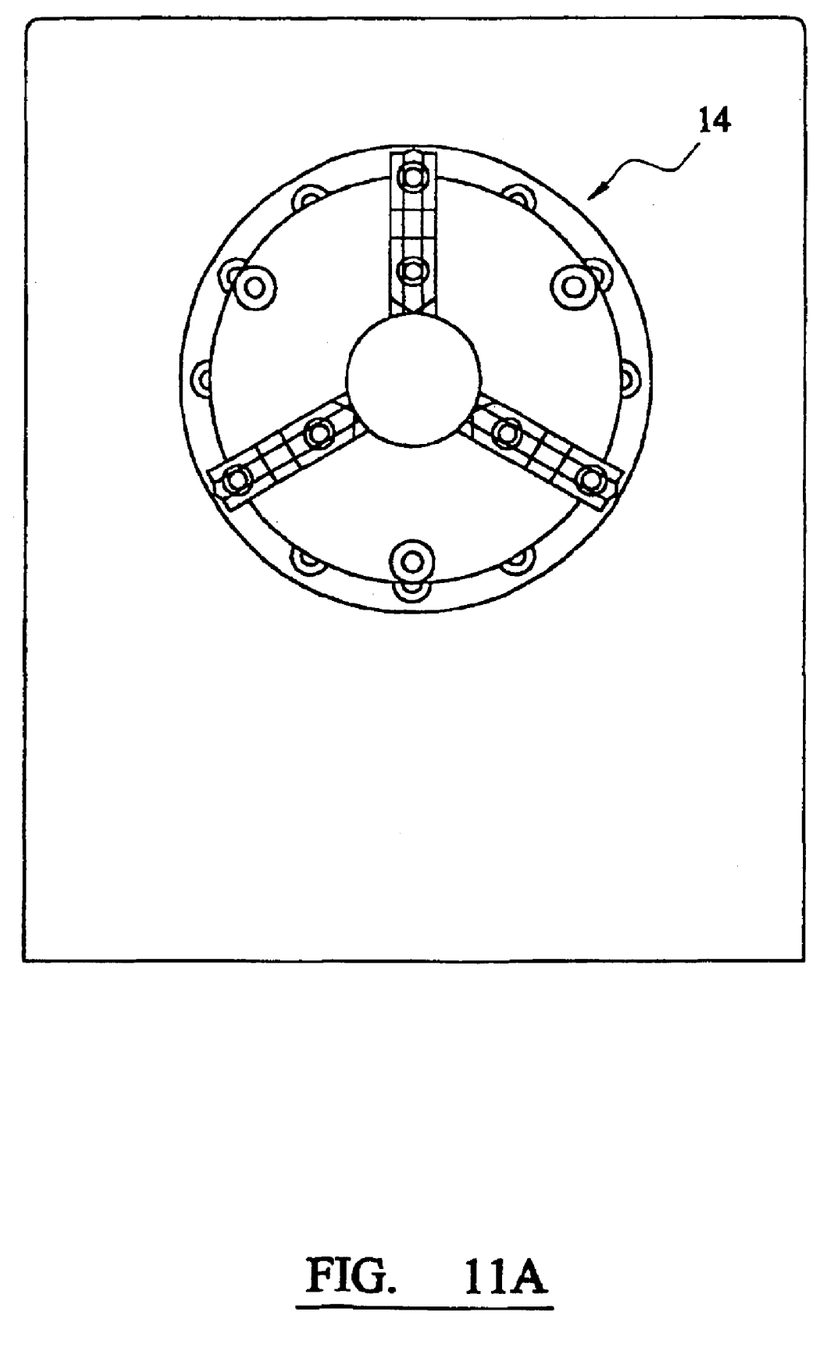
FIG. 11A is an end view showing the chuck jaws, FIG. 12 illustrated the various components of the arrangement shown in FIG. 10.

Referring to FIG. 10, in this embodiment the couplings (2,5) are replaced by an assembly 12 of components which cooperate according to the principle of a dog clutch, to either lock the drive pulley 1' to the spindle 6' or to unlock it therefrom. When the drive pulley 1' is unlocked from the spindle 6', rotation of the drive pulley relative to the spindle 6' rotates the draw or torque tube 8' which in turn rotates the scroll chuck 14. Also shown in FIG. 10 is a pulley 16 for the shaft encoder.

Figure 12:
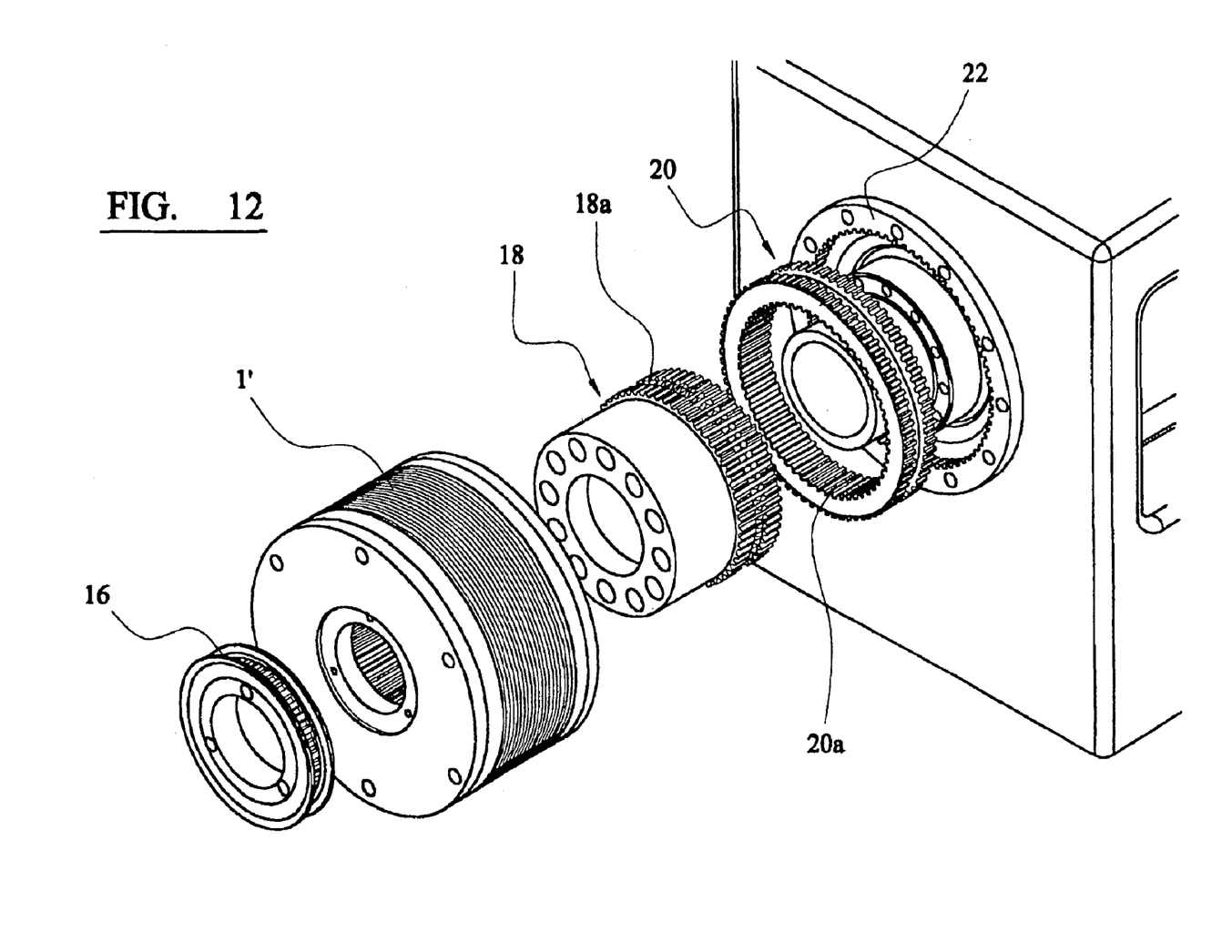

The locking/unlocking arrangement is shown in more detail in FIG. 12. The drive pulley 1' fits over the spindle attachment 18 such that the end 18*a* bearing the teeth protrudes from the drive pulley. A clutch 20 which has teeth both internally and externally is disposed for lateral movement between two positions, a first position in which the outer surface of clutch 20 is engaged with a fixed plate 22 (and hence the drive pulley 1' is unlocked from the spindle 6' and locked to the headstock), and a second position in which the inner surface of clutch 20 is engaged with the spindle attachment 18*a* (when the drive pulley is locked to the spindle 6' and unlocked from the headstock). The splines on the fixed plate 22 may be arranged such that the increments of angular movement are 5°.

Clutch 20 includes a hole 20*a* for a ball detent (also shown in FIGS. 10 and 11) provides a snap action that holds the clutch 20 in position and prevents the clutch moving under the influence of vibration. The detent effectively replaces the spring 3 as previously described.

In a yet further embodiment a magnetic force, for example provided by permanent magnet(s) may hold the clutch against the drive pulley and provides an embodiment which is easier to manufacture.

Figure 12A:
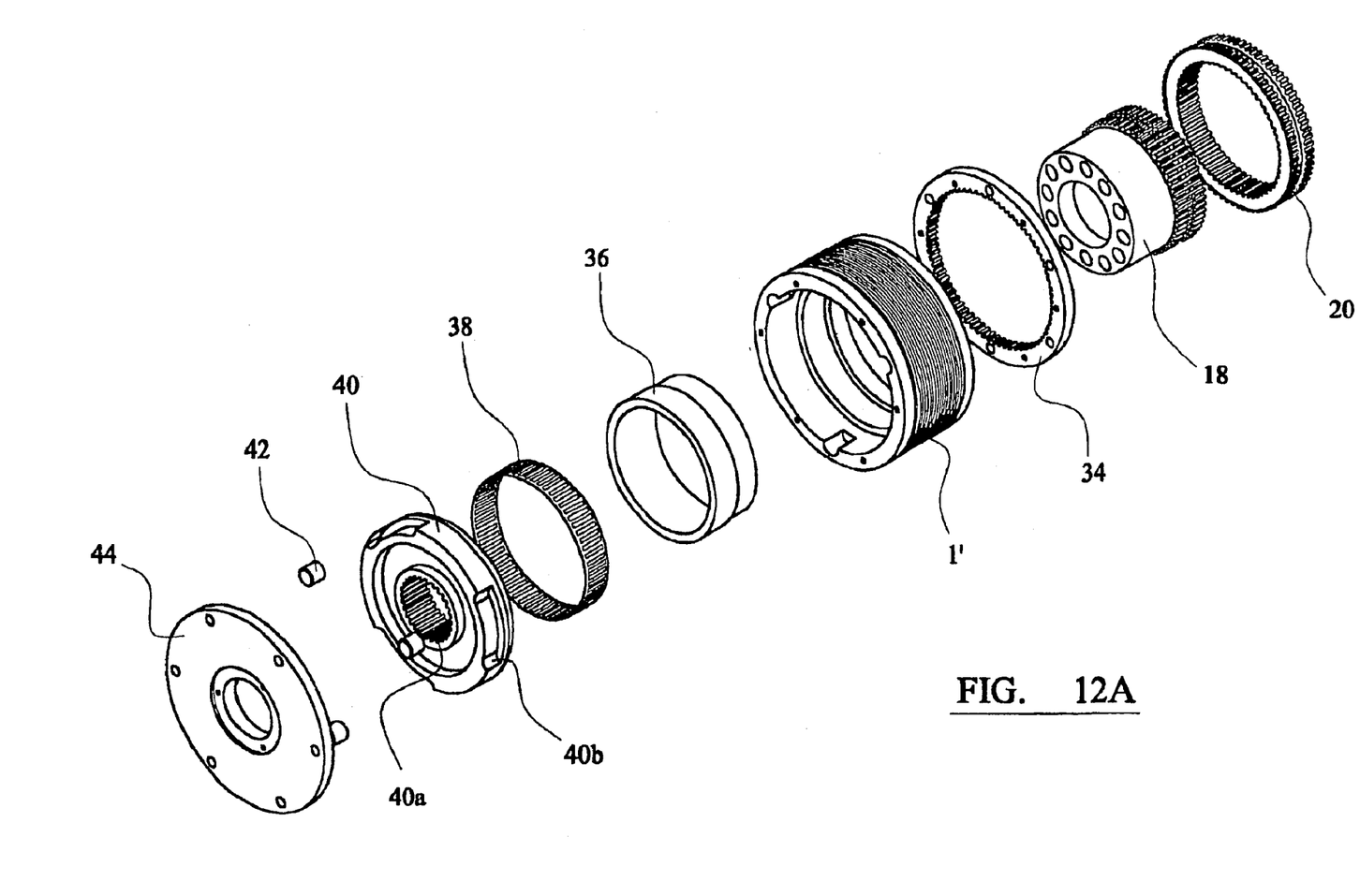
FIG. 12A illustrates the various components of the drive pulley and spindle attachment.

Referring to FIG. 12A, the drive pulley 1' is shown in more detail with the various different associated components. Splined clutch ring 34 locks the spindle 6' to the pulley 1' via spindle attachment 18 and clutch 20, such that in normal operation the spindle 6' is driven by the prime mover, and is bolted directly to the pulley 1'.

Component 36 is a bearing bush including a hardened surface for the roller bearing 38 (which carries radial loads when the drive pulley revolves around the spindle during chuck actuation) to run on. Alternatively, proprietary bearings may be used.

Torque drive plate 40 transfers the drive pulley torque to the torque tube 8' via the splined teeth 40*a*. When the chuck is actuated the drive pulley drives the rollers 42 in the concentric groove 40*b* until the roller reaches the groove end at which point the torque drive plate 40 rotates and drives the torque tube 8'. The concentric grooves 40*b* (which may extend for substantially 30°) provide backlash, so that the drive pulley can be reverse wound a sufficient angular displacement to re-engage the spline teeth of the clutch ring 34 without loosening the chuck's grip on the workpiece. In addition the concentric grooves enable momentum to be built up in order to maximise force immediately upon rotation rather than the rotational force gradually building up. In addition, this will produce a hammer effect which is particularly useful with the clamping movement and especially the unclamping movement.

As mentioned above, the roller/cylindrical drive pin 42 provides load transfer between the drive pulley 1' and torque drive plate 40. The drive pulley cover plate 44 closes off the mechanism and retains parts as well as providing a boss for the encoder pulley 16. Accordingly, the encoder is continuously connected to the moving part and thereby is able to facilitate positional control to align the clutch teeth when coupling and uncoupling, avoiding the need for two separate encoders.

Figure 13:
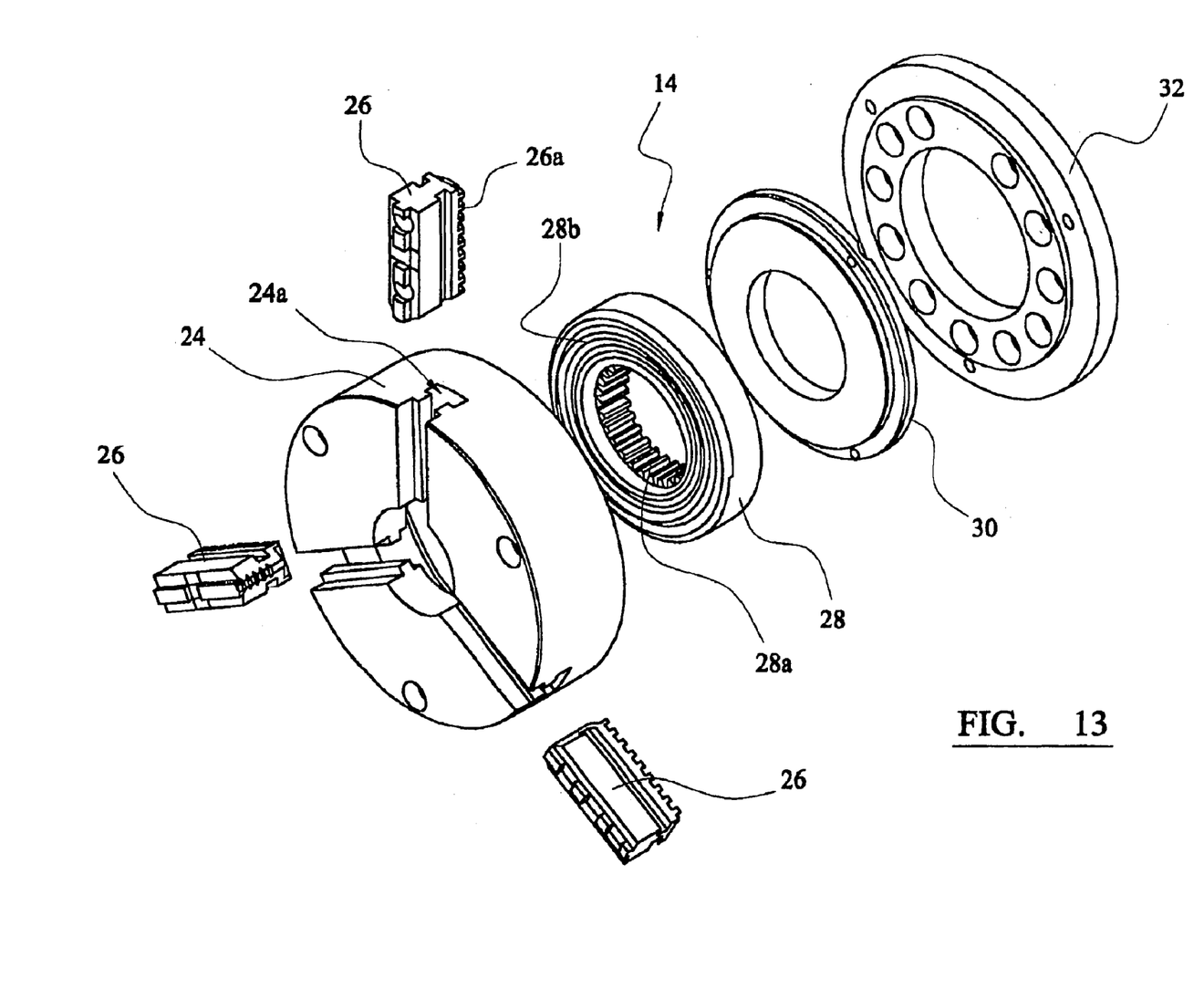
FIG. 13 illustrates the various components of the scroll chuck.

Referring now to FIG. 13, the scroll chuck 14 comprises a chuck with three jaws 26 which fit in slots 24*a*. Each jaw 26 has teeth 26*a* which mesh with slots 28*b* on the scroll 28. The scroll chuck assembly is completed by a backplate 30 and an adaptor 32.

The scroll chuck system offers two significant advantages. firstly, the use of a scroll chuck provides a greater jaw stroke, approximately 10 times that of a conventional power chuck. Secondly, the integration of the chuck control system offers considerable flexibility especially for automated operations, for example, it would be relatively simple to program the system such that a robot arm could change the chuck jaws and use predefined parameters for controlling the chucking system for programmed parts (jaw position, clamping force etc.).

Once assembled, it can be seen how the jaws 26 may be moved radially in and out along slots 24*a*. Uncoupling of the drive pulley 1' from the spindle 6' by movement of the dog clutch 20 (for example by means of an electromagnetic actuator or similar) results in rotation of the torque tube 8'. At the other end of the torque tube, this rotation is transmitted via the teeth 8'*a* on the torque tube meshing with the teeth 28*a* of the scroll—as the scroll rotates the teeth of the jaws 26 are forced to move in and out as they travel along slots 28*b* on the scroll.

Thus, the present invention permits an otherwise manually operated scroll chuck to be operated by the main spindle drive.

Any feature of any aspect of any invention or embodiment described herein may be combined with any other feature of any aspect of any invention or embodiment described herein.

The reader's attention is directed to all papers and documents which are filed concurrently with or previous to is this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. A chucking system, comprising a chuck with jaws for holding a work piece, the chuck being mounted on a spindle for rotation therewith by means of the machine drive, chuck actuator means for moving the jaws to grin or release the work piece, transmission means whereby the machine drive is normally coupled to the spindle to cause rotation thereof, a coupling which is normally biased into engagement with the transmission means whereby the machine drive is transmitted, through the coupling, to the spindle and means for selectively uncoupling said transmission means from the spindle such that rotation of the uncoupled transmission means relative to the spindle drives the chuck actuator means, and in which the coupling includes a clutch.

2. A system according to claim 1 in which the clutch comprises a dog clutch.

3. A chucking system, comprising a chuck with jaws for holding a work piece. the chuck being mounted on a spindle for rotation therewith by means of the machine drive, chuck actuator means for moving the jaws to grip or release the work piece, transmission means whereby the machine drive is normally coupled to the spindle to cause rotation thereof, a coupling which is normally biased into engagement with the transmission means whereby the machine drive is transmitted, through the coupling, to the spindle and means for selectively uncoupling said transmission means from the spindle such that rotation of the uncoupled transmission means relative to the spindle drives the chuck actuator means, and in which the coupling includes a clutch, and in which the coupling is disposed for lateral movement between a first position in which a first surface of the clutch engages with a plate fixed to a headstock, thereby unlocking the transmission means from the spindle whilst at the same time locking it to the headstock, and a second position in which a second surface of the coupling engages with an attachment fixed to the spindle, thereby locking the transmission means to the spindle whilst at the same time unlocking it from the headstock.

* * * * *